UNITED STATES PATENT OFFICE.

AUGUST E. NIENSTADT, OF BENSONHURST, NEW YORK.

FOOD PRODUCTS AND PROCESS OF MAKING SAME.

1,199,018.  Specification of Letters Patent.  Patented Sept. 19, 1916.

No Drawing.  Application filed May 13, 1915.  Serial No. 27,763.

*To all whom it may concern:*

Be it known that I, AUGUST E. NIENSTADT, a citizen of the United States of America, and a resident of Bensonhurst, county of Kings, and State of New York, have invented certain new and useful Improvements in Food Products and Processes for Making Same, of which the following is a specification.

This invention has reference to novel food products and process of making the same.

It pertains particularly to novel food products existing in the form of bread, granulated substances or as a fine powder.

Common bread, breakfast foods and the like are generally prepared of grains. The grains of the cereal plants chiefly contain carbohydrates as nutritious elements principally starch which may be transformed into dextrin, glycosids and sugar.

The novel food products forming the subject matter of the present invention, in addition to the substances occurring in the grains, also contain nitrogenous compounds, phosphates and other substances not found in the grains of the cereal plants from which bread and breakfast foods are prepared.

One of the principal constituents of the novel food products is the albuminous ingredient of milk which preferably is used in the form of potcheese. The albumins of milk are the chief nitrogenous ingredients of the milk which scientifically constitutes one group of the five large groups of the albumins. The albumins of milk, the casein, lactalbumin and another albuminous complex are of the most important elements of human nutrition. Research up to the present time has not cleared the constitution of the albumins. However, the principal constituents of the same are known to be the elements: carbon, hydrogen, oxygen, traces of sulfur and about 15.5 per cent. of nitrogen. The casein of milk further contains a special phosphorized radical in combination with an albuminous complex. Thus, phosphorus is also contained in this substance which contains practically all the elements of which the human body is composed. The various elements of the milk albumins indicate a highly complex organic body which also contains traces of salts. These albumins, in the form in which they are contained in the novel food products are digestible by the human system and, in conjunction with starch found in baking flour which is another component of the novel food products, they are sufficient to keep the human system in an unimpaired condition. Accordingly the novel food products may constitute a complete meal without meat, which is especially valuable as a cheap food stuff for the general populace, for army and navy purposes, especially soldiers who sometimes are not allowed to kindle fires for cooking.

The albumins of milk are rendered soluble by means of an alkali and the resulting albuminates are mixed with flour, water, salt, grease, and yeast or similar dough raising material. The raised dough is worked up into loaves and baked in the usual manner.

The proportions in which the various constituents of the novel food products are compounded may vary within certain limits for specific purposes. One composition which answers for various purposes consists of one pound of the albumins of milk and one quarter ounce of an alkali, preferably bicarbonate of soda which forms soluble milk albuminates. Now three pounds of flour are mixed with the albuminates and a dough is formed by adding the necessary quantity of water and kneading the mass. The usual substance for raising the dough, for instance yeast, and sufficient salt and grease are incorporated in the usual manner. The dough is formed into the desired shape, such as loaves and the like and baked in the usual manner. The resulting food product, bread in this instance, is of agreeable taste and keeps longer than common bread without getting dry. The albumins of milk are not easily digestible by weak stomachs or by children. However, when transformed into albuminate it is easily digestible. The nutritious qualities of the bread have been described herein and its superiority over common bread pointed out. This is due to the presence of the nitrogenous ingredients of the albuminates of milk compounded with the starchy components of the flour. Thus the novel food products contain the various substances herein enumerated which are acknowledgedly the most important nutritious element for the preservation of the human system in an unimpaired state.

In addition to the bread herein described as a novel food product which contains both carbohydrates and nitrogenous compounds, some phosphorized albuminous complex, a little sulfur and salts, other novel food products may be prepared. The albuminates of milk prepared as described while in solution are mixed, one pound of albuminates with one pound of flour. The resulting mass is dried and granulated or reduced to fine powder, in any approved manner. The granulated substance and the powder may be stored and transported. The granulated substance is used as breakfast food in this form. The powder may be mixed with some more flour to bring it up to the proportions stated in the description for making bread and all the other substances required for the same are added thereto. This mass is treated as described to make dough from which bread may be baked. If these materials are found for instance, on board of a vessel which is unduly delayed it may be resorted to as a means for keeping the crew in a healthy condition even if nothing else should be available as food stuffs. It is thought that under such circumstances beri-beri would not occur. It is evident that the novel breakfast food, containing both the carbohydrates, nitrogenous compounds, phosphates, etc., are far superior to the breakfast foods found in the market at present for the reasons herein stated.

The dry powder of albuminates of milk and flour composed of equal parts may be used as a substitute for egg albumen for various purposes.

The powder of the albuminates of milk mixed with an equal quantity of fresh butter forms a very tasty and nourishing product for all kinds of uses and resembles sweet butter.

I claim as my invention:

1. The process of producing food products consisting in transforming the nitrogenous, albuminous ingredient of milk into albuminates, mixing therewith flour from the grains of the cereal plants, and working up the resulting mass into food products.

2. The process of producing food products consisting in transforming the nitrogenous, albuminous phosphorus bearing ingredient of the milk into albuminates, mixing therewith flour from the grains of cereal plants, and working up the resulting mass into food products.

3. The process of producing food products consisting in adding an alkali to the nitrogenous, albuminous ingredient of milk to transform the albumins into albuminates, mixing therewith flour from the grains of the cereal plants, and working up the resulting mass into food products.

4. The process of producing food products consisting in adding bicarbonate of sodium to the nitrogenous, albuminous phosphorus bearing ingredient of milk to transform the albumins into albuminates, mixing therewith flour from the grains of the cereal plants, and working up the resulting mass into food products.

5. The process of producing food products consisting in transforming an edible, nitrogenous, albuminous ingredient into soluble form, mixing therewith flour from the grains of cereal plants, water, salt, grease, and a dough raising material, and working up the dough into baked products.

6. The process of producing food products consisting in transforming the nitrogenous, albuminous ingredient of milk into soluble albuminates, mixing therewith flour from the grains of cereal plants, water, salt, grease, and a dough raising material, and working up the dough into baked products.

7. The process of producing food products consisting in transforming the nitrogenous, albuminous phosphorus bearing ingredient of milk into soluble albuminates, mixing therewith flour from the grains of cereal plants, water, salt, grease, and a dough raising material, and working up the dough into baked products.

8. As a novel food product an edible product composed of the nitrogenous albuminous, ingredient of milk, in soluble form, and flour from the grains of the cereal plants containing carbohydrates.

9. As a novel food product an edible product composed of the nitrogenous, albuminous phosphorus bearing ingredient of the milk in soluble form, and flour of the grains of the cereal plants containing carbohydrates.

10. As a novel food product an edible product composed of the nitrogenous albuminous ingredient of milk in soluble form, and flour from the grains of the cereal plants containing carbohydrates, and existing in form of fine particles.

11. As a novel food product an edible product composed of the nitrogenous, albuminous phosphorus bearing ingredient of the milk in soluble form, and flour of the grains of the cereal plants containing carbohydrates and existing in form of a flour.

Signed at New York, N. Y., this 12th day of May, 1915.

AUGUST E. NIENSTADT.

Witnesses:
ELEANORE J. HOFFMANN,
MARJORIE MCNAMEE.